United States Patent [19]

Suzuki et al.

[11] Patent Number: 4,855,123
[45] Date of Patent: Aug. 8, 1989

[54] METHOD OF OXIDIZING SULFIDE-CONTAINING LIQUOR

[75] Inventors: Masayuki Suzuki; Shinichi Hara; Kuniaki Kimura, all of Hachinohe; Takeo Ono, Kawasaki; Munekazu Nakamura, Yokohama; Yoshihiro Ohguchi, Ebina, all of Japan

[73] Assignee: Mitsubishi Paper Mills, Ltd., Japan

[21] Appl. No.: 170,667

[22] Filed: Mar. 10, 1988

Related U.S. Application Data

[63] Continuation of Ser. No. 927,698, Nov. 6, 1986, abandoned.

[30] Foreign Application Priority Data

Apr. 18, 1986 [JP] Japan ................................. 61-89777

[51] Int. Cl.$^4$ ........................ C01B 17/22; C01D 1/04
[52] U.S. Cl. .................................. 423/562; 423/642; 162/82; 162/90; 210/763; 502/180
[58] Field of Search ................... 423/511, 561 A, 562, 423/642, 571, 641; 502/180; 210/763; 162/38, 82, 90

[56] References Cited

U.S. PATENT DOCUMENTS

| | | | |
|---|---|---|---|
| 1,146,363 | 7/1915 | Statham | 502/416 |
| 1,934,626 | 11/1933 | Nagelvoort | 423/562 |
| 2,047,492 | 7/1936 | Reissmann et al. | 423/562 |
| 2,164,141 | 6/1939 | Moore | 423/642 |
| 2,719,076 | 9/1955 | Koudela et al. | 423/561 A |
| 2,722,473 | 11/1955 | Toland, Jr. | 423/562 |
| 3,216,887 | 11/1965 | Landmark | 162/82 |
| 3,457,046 | 7/1969 | Hoekstra | 423/571 |
| 3,470,061 | 9/1969 | Barker | 162/38 |
| 3,672,836 | 6/1972 | Brown | 423/571 |
| 3,723,242 | 3/1973 | Barker | 162/38 |
| 3,860,479 | 1/1975 | Barker et al. | 423/562 |
| 4,024,229 | 5/1977 | Smith et al. | 423/642 |
| 4,028,269 | 6/1977 | Carlson et al. | 502/163 |
| 4,073,748 | 2/1978 | Brown et al. | 423/562 |
| 4,358,427 | 11/1982 | Urban | 423/571 |

FOREIGN PATENT DOCUMENTS 0814882 6/1969 Canada ................................. 423/562

OTHER PUBLICATIONS

Netsusokutei 8(1), 2-5 (1981).
"Treatment of Water by Granular Activated Carbon", Advances in Chemistry Series, American Chem-Society, 1983, Michael J. McGuire (Editor).
Yoshida et al., Netsusokutei 8(1), 1981, 2-5.

*Primary Examiner*—Anthony Mc Farlane
*Attorney, Agent, or Firm*—Lorusso & Loud

[57] ABSTRACT

A method of treating an aqueous sodium sulfide solution, such as white liquor in kraft pulping systems, for the oxidation of the sulfide with oxygen in the presence of a specific activated carbon catalyst which is (a) a particulate activated carbon catalyst having an average particle diameter of 0.2–4 mm, a pore volume of at least 0.25 cc/g in pores with diameters of not smaller than 100 Å and a pore volume of at least 35% of the total pore volume in pores with diameters of not smaller than 100 Å or (b) a fibrous activated carbon catalyst having a specific surface area of 300–2500 m$^2$/g and an outer surface area of 0.1–5 m$^2$/g.

14 Claims, 5 Drawing Sheets

METHOD OF OXIDIZING SULFIDE-CONTAINING LIQUOR

This application is a continuation of application Ser. No. 927,698 filed 1/16/86, now abandoned.

This invention relates generally to a method of oxidizing a sulfide-containing aqueous solution and, more specifically, to a method of treating a sodium sulfide-containing aqueous solution, such as a green liquor, white liquor or orange liquor from a kraft pulping process, for oxidizing the sulfide with oxygen in the presence of a specific catalyst.

In the kraft pulping process, it is known to be effective to use a cooking liquor containing polysulfide for the digestion of wood. In such a pulping system it is indispensable to treat the spent cooking liquor and to prepare a polysulfide-containing cooking liquor therefrom. Thus, the spent liquor, which is called black liquor, is concentrated and combusted. The melt of inorganic chemicals, which is called smelt, obtained as a residue from this combustion is dissolved to form green liquor essentially consisting of sodium carbonate, sodium thiosulfate and sodium sulfide. The sodium carbonate is then converted into sodium hydroxide by causticizing. The causticized clear liquor is called white liquor.

Various processes have been proposed for oxidizing sodium sulfide solutions with the oxidation-reduction catalysts. Desirable catalysts for the oxidation of sodium sulfide should have the following characteristics:

(1) To have high catalytic activity for the oxidation of sodium sulfide;

(2) To permit a sufficient amount of oxygen access to the catalyst surface;

(3) To have electrical conductivity so that electron transfer resulting in the oxidation of sodium sulfide easily occurs;

(4) To have resistance to alkali;

(5) To be easily recovered from a reactor and regenerated; and (6) To be available at low cost.

Catalysts proposed in the prior art processes are not entirely satisfactory. For example, U.S. Pat. No. 4,024,229 issued to Smith et al discloses a process for the production of sodium polysulfide from sodium sulfide, in which an aqueous sodium sulfide solution, oxygen and a catalyst are brought into contact with each other to oxidize the sodium sulfide to sodium polysulfide. The catalyst is particulate carbon wetproofed with a hydrophobic substance such as polytetrafluoro-ethylene (PTFE). The object of the wetproofing treatment is to prevent the catalyst from being flooded by the reductant (aqueous sodium sulfide). With the oxidation-reduction catalyst of Smith et al, the wetproofing treatment should be conducted so that a portion thereof is encapsulated with PTFE or the like hydrophobic substance. It is however difficult to impart a desired degree of wetproofing properties uniformly to particulate carbon. Further, such a treatment tends to decrease active sites of the catalyst. In addition, the surface of the catalyst particles tends to be covered with PTFE as a result of the wetproofing treatment, causing plugging of the catalyst pores. This prevents the oxidant from being sufficiently fed to the catalyst surface. Thus, the catalyst disclosed in the Smith et al patent fails to meet with the criteria (1) and (2) described above.

Further, there are proposed a lot of methods in which sodium sulfide is oxidized using activated carbon powder as a catalyst. For example, Yoshida et al [Netsusokutei 8(1) 1981, 2-5] report that, in the reaction of an aqueous sodium sulfide solution having dispersed carbon black powder, surface functional groups of the carbon black play a part in accelerating the oxidation of sodium sulfide. From the industrial point of view, however, such a method in which the oxidation is effected by bubbling air or oxygen through an aqueous solution containing sulfides and activated carbon powder with stirring is not advantageous because the separation and recovery of the activated carbon powder for reuse encounters considerable difficulties.

The present invention has been made in the light of the above problems of the conventional method and contemplates the provision of a sodium sulfide-oxidation catalyst which satisfies all of the above criteria.

In accordance with one aspect of the present invention there is provided a method for the oxidation of a sulfide contained in an aqueous solution, comprising contacting the aqueous solution with an oxygen-containing gas in the presence of an activated carbon catalyst which is a particulate catalyst having an average particle diameter of 0.2-4 mm, a pore volume of at least 0.25 cc/g in pores with diameters of not smaller than 100 Å and a pore volume of at least 35% of the total pore volume in pores with diameters of not smaller than 100 Å or a fibrous catalyst having a specific surface area of 300-2500 $m^2/g$ and an outer surface area of 0.1-5 $m^2/g$.

In another aspect, the present invention provides a process of treating an aqueous solution containing sulfide and suspended solids, comprising the steps of:

(a) flowing said aqueous liquor up through a bed of granular solids for filtering off the suspended solids, whereby a filtrate which is substantially free of the suspended solids is obtained; and (b) contacting said filtrate and an oxygen-containing gas concurrently with an activated carbon catalyst in a fixed bed to oxidize the sodium sulfide, said activated catalyst being a particulate catalyst having an average particle diameter of 0.2-4 mm, a pore volume of at least 0.25 cc/g in pores with diameters of not smaller than 100 Å and a pore volume of at least 35% of the total pore volume in pores with diameters of not smaller than 100 Å or a fibrous catalyst having a specific surface area of 300-2500 $m^2/g$ and an outer surface area of 0.1-5 $m^2/g$.

The process according to the present invention is suitably adopted for the treatment of a sodium sulfide-containing solution to convert the sulfide into as much polysulfide as possible or into sodium hydroxide. White liquor or green liquor in the kraft pulping systems may be advantageously treated in accordance with the process of the present invention. The resulting sodium polysulfide-containing liquor may be suitably used as a cooking liquor for polysulfide pulping process. The sodium hydroxide-containing liquor may be used as caustic liquor in the bleaching process.

BRIEF DESCRIPTION OF THE DRAWINGS

The present invention will be described in detail below with reference to the accompanying drawings, in which.

Figure 1:
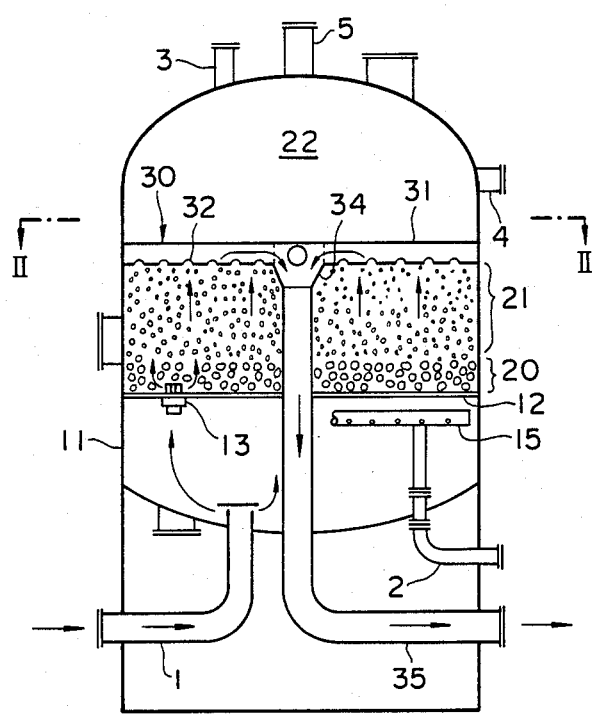
FIG. 1 is a cross-sectional, elevational view diagrammatically showing an up-flow type filtrating device used in the process according to the present invention.

The catalyst in the present invention is a particulate activated carbon catalyst or a fibrous activated carbon catalyst.

The particulate activated carbon may be prepared from a variety of raw materials such as wood chips, petroleum pitch, coal and palmshells. The particulate catalyst should have an average particle diameter of 0.2–4 mm, a pore volume of at least 0.25 cc/g in pores with diameters of not smaller than 100 Å and a pore volume of at least 35% of the total pore volume in pores with diameters of not smaller than 100 Å.

The present inventors have found that in order to effect the oxidation of sodium sulfide efficiently it is important that as much oxygen as possible should diffuse into pores of the catalyst and arrive at active sites, and that, to achieve this purpose, it is essential that the catalyst should have a large amount of pores with large diameters. More particularly, the volume of pores with a diameter of 100 Å or more should be at least 0.25 cc/g, preferably at least 0.35 cc/g, and should be at least 35% of the total pore volume of the catalyst.

A particulate activated carbon catalyst having a large amount of pores with a diameter of 100 Å has generally a large total pore volume and, hence, low bulk density. Thus, it is generally preferred that the catalyst have a bulk density of 0.5 g/cc or less.

The average particle size of the particulate catalyst should be 0.2–4 mm, preferably 0.5–2 mm. With a particulate catalyst having an average particle size of greater than 4 mm, the diffusion of oxygen to the active surfaces tends to be inhibited, causing the lowering of the catalytic activity. While an average particle size of less than 0.2 mm is preferable with respect to the diffusion of oxygen, the catalyst with such an excessively small average diameter causes problems in operation of the process on an industrial scale such as pressure loss in the oxidation reactor.

For the purpose of the present specification, the pore volume of the particulate catalyst is determined as follows. The volume of pores with diameters of 100 Å or more is determined from the distribution of pores with a pore diameter of 35 Å or more measured by means of a mercury penetration porosimeter (Auto Pore 9200 manufactured by Micrometritics Inc., U.S.A.). The volume of pores with diameters of less than 100 Å is calculated according to the Cranston-Inkly method from the isothermal nitrogen-adsorption-desorption curve measured by an automatic gas adsorption-desorption device (Sorptomatic 1800 manufactured by Carlo Erba, Italy). The total pore volume is a sum of the above two pore volumes.

The fibrous activated carbon catalyst used in the present invention may be obtained, for example, from thermosetting materials such as rayons, PAN (polyacrylonitrile) and phenol resins or thermoplastic materials such as PVA (polyvinyl alcohol) and pitch. The fibrous catalyst should have a specific surface area of 300–2500 $m^2/g$. A specific surface area of at least 300 $m^2/g$ is required in order for the catalyst to have sufficient active sites. On the other hand, a specific surface area of more than 2500 $m^2/g$ causes the catalyst weak tube mechanical strength.

The specific surface area in the present specification is determined according to the Cranston-Inkly method from an isothermal nitrogen-adsorption-desorption curve measured by an automatic gas adsorption-desorption device (Sorptomatic 1800 manufactured by Caro Erba, Italy).

The fibrous catalyst should have a surface area of 0.1–5 $m^2/g$. Under the reaction conditions, the outer surface of the catalyst is covered with a liquid film (aqueous sodium sulfide solution). Thus, oxygen is diffused to the active sites of the catalyst through the liquid film. Therefore, the larger the outer surface area, the greater becomes the amount of oxygen that can arrive at the active sites of the catalyst. An outer surface area of less than 0.1 $m^2/g$ is thus insufficient to provide the active sites. However, too large an outer surface area over 5 $m^2/g$ causes weak mechanical strength of the catalyst because the diameter of the fiber becomes too small.

The form of the fibrous activated carbon catalyst is not specifically limited and may be, for example, chops, yarns, felts, sheets, clothes or mats. These are used as such or may be further processed into any desired structures such as rolled felt sheets, honeycomb structures with or without using reinforcing materials such as wire nets.

The oxidation of a sulfide-containing solution according to the present invention is effected by contacting the solution with an oxygen-containing gas such as air in the presence of either the particulate catalyst or the fiber catalyst as described above. The following reactions occur when aqueous sodium sulfide is subjected to such catalytic oxidation:

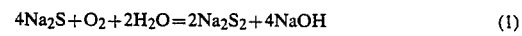
$$4Na_2S + O_2 + 2H_2O = 2Na_2S_2 + 4NaOH \qquad (1)$$

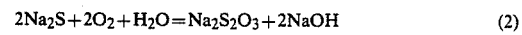
$$2Na_2S + 2O_2 + H_2O = Na_2S_2O_3 + 2NaOH \qquad (2)$$

$$2Na_2S_2 + 3O_2 = 2Na_2S_2O_3 \qquad (3)$$

Polysulfide ($Na_2S_x$ where x is a number of 2–5) is produced in the reaction (1), but is shown as sodium disulfide here for the purpose of simplicity.

Thus, in order to produce as much polysulfide as possible, it is necessary to expedite the reaction (1) while suppressing the reactions (2) and (3). In view of the fact that the reactions (2) and (3) require a higher oxygen to sulfide molar ratio than in the reaction (1), the selectivity to polysulfide may be improved by suitably selecting the reaction conditions. More particularly, the yield of polysulfide may be improved by allowing the reaction (1) to proceed effectively in the presence of a relatively small amount of oxygen and by preventing the polysulfide from contacting with oxygen. This may be achieved by the use of a catalyst with high activity and efficiently effecting the contact between the oxygen-containing gas (oxidant) and aqueous sodium sulfide solution (reductant).

Thus, in one preferred embodiment of the process of the present invention, the catalyst is packed in a reactor through which the oxidant and reductant are flown cocurrently in a trickle flow. Counter-current contact between the oxidant and reductant is disadvantageous because the polysulfide produced is contacted with fresh oxidant so that the reaction (3) is facilitated. Downward flow of the reactants is also important, especially when the catalyst used is a fibrous catalyst, to form thin liquid films over the surfaces of the fibrous catalyst and to effect the diffusion of the oxidant smoothly and homogeneously. If the oxidant and reductant are flown upwardly, the gas (oxidant) is bubbled through the liquid so that the oxidation cannot effectively proceed even if a fibrous catalyst with a large outer surface area is employed.

In the above-described downward concurrent flow, it is preferred that a portion of the oxidant is supplied from an intermediate portion or portions of the catalyst bed. When all the necessary oxygen is supplied from the top of the reactor, polysulfide produced at the upper portion of the catalyst bed can contact with a large amount of oxygen, so that the polysulfide is further oxidized according to the reaction (3). By reducing the amount of the oxidant fed from the top of the reactor, the reaction (3) at the upper portion of the catalyst bed can be inhibited. The remainder of the oxidant, generally 25% or less of the total oxidant feed, is supplied to the reaction system in a later stage or stages.

When the perfect oxidation [(at least 80% conversion of $Na_2S$ in the reaction (2)] of the aqueous sodium sulfide solution according to the reaction (2) is intended for the production of as much NaOH as possible, it is important that the sulfide solution should be contacted with a large amount of oxygen. Thus, the oxidant and reductant are flown through a fixed bed of the catalyst and brought into either counter-current contact or cocurrent contact. The oxidant is supplied from the bottom of the reactor while the reductant is supplied from the top.

For the purpose of improving the efficiency of the gas-liquid contact on the catalyst bed, it is preferred that the fixed bed of the catalyst be divided into a plurality of vertically spaced apart catalyst layers and that a liquid distributor be provided between each adjacent layers. The liquid distributor may be a perforated plate having a total area of the opening of 15-35%. Generally, a liquid, during its passage down through a packed tower, tends to flow along the inside wall of the tower and become non-uniform in the middle and lower portions. In the present invention, in order to prevent such deflected liquid flows and to increase the reaction efficiency, a relatively large number of the liquid dispersing plates are desirably provided, for example with a distance of 1-2 m. Such dispersing plates also serve as a reinforcing member for the fixed catalyst bed, especially for the fibrous catalyst.

The oxidation is preferably performed at a temperature of 50°-130° C. and a pressure of 0-10 $Kg/cm^2G$ with the oxidant (oxygen-containing gas) to reductant (aqueous sodium sulfide solution) feed ratio of 10-500 normal-liter/liter and a weight hourly space velocity of 0.5-500 $hour^{-1}$. Since the white liquor and green liquor obtained in the kraft pulping process generally have a temperature of 70°-100° C., it is not necessary to heat or cool the reactor if such liquors as such are to be treated. With regard to the reaction pressure, a higher pressure is more preferred because the diffusion of oxygen into pores of the particulate catalyst or to the surfaces of fibrous catalyst covered with liquid films is more facilitated. However, too high a pressure is not advantageous for the production of sodium polysulfide because the occurrence of the side reactions (2) and (3) are expedited. The oxidant/reductant feed ratio is based on the feed rates at the inlet port of the fixed bed reactor. The diffusion rate of oxygen to the catalyst surface depends on the feed ratio; i.e. the higher the feed ratio, the more becomes the amount of diffusable oxygen. However, an excess feed ratio over the above range is not advantageous in the case of the production of polysulfide because of the occurrence of the side reactions (2) and (3). The weight hourly space velocity may be selected from the above-described range in consideration of the activity of the catalyst, the conditions under which the oxidation is performed and the kind and amount of the desired products.

While liquor produced in the kraft pulping system contains a large amount (generally 50-300 ppm) of suspended solids such as calcium carbonate and ferrous sulfide. Such suspended solids tend to cause the plugging of the catalyst bed and adversely affect the activity and selectivity of the catalyst. Therefore, when the sulfide-containing solution to be oxidized contains such suspended solids in an amount of 20 ppm or more, it is preferred that the solution be pretreated for the removal of the suspended solids so that the content of the suspended solids is decreased to 5 ppm or less, preferably 3 ppm or less. The removal of the suspended solids may be effected by filtration.

In a preferred embodiment according to the present invention, the filtration is performed with the use of a pressure-type, deep bed upflow filtering device. FIG. 1 depicts one preferred embodiment of such an upflow filtering device. The device includes a tank or housing 11 generally cylindrical in shape. A circular supporting plate 12 is secured within the housing 11 for supporting thereon a bed of granular solids 20 serving as a supporting layer for a filter bed 21 provided on the supporting layer 20. A plurality of liquid distributers 13 are mounted through the supporting plate 12 to distribute an incomming liquor supplied through an inlet pipe 1 uniformly to the filter bed 21 via supporting layer 20.

The supporting layer 20 is constituted from a plurality (generally 3-4) of sub-layers formed of granular solids with different grain sizes in the range of 2-50 mm, the sub-layers being arranged so that the grain size of one sub-layer is smaller than its adjacent lower sub-layer.

The filter bed 21 is also composed of two or more sub-layers of granular solids with particle sizes ranging from 0.3-1.8 mm, the sub-layers being arranged so that the particle size of one sub-layer is smaller than its adjacent lower sub-layer.

Figure 2:
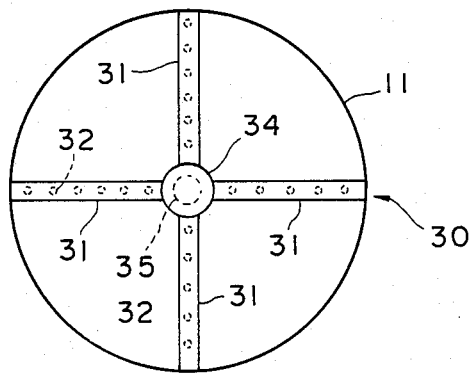
FIG. 2 is a cross section taken on line II—II in FIG. 1.

Disposed adjacent to the upper surface of the filter bed 21 is a filtrate recovering member, generally designated as 30, for collecting the filtrate which has been passed through the filter bed 21. As shown in FIG. 2, the recovering member 30 includes a central cylinder 34 from which a plurality (four in the illustrated case) of horizontal collecting pipes 31 extend radially outwardly and welded in their ends to the interior wall of the housing 11. Each pipe 31 is provided with a multiplicity of small openings 32 at its lower side. The diameter of the openings 32 is generally smaller than the particle size of the filter granules in the upper portion of the filter bed 21. The filtrate recovering member 30 is preferably disposed at a position so that the lower side of the pipes 31 is in contact with or embedded in the upper portion of the filter bed 21. More preferably, the recovering member 30 is so disposed that the openings 32 are located at a level lower by about 30-300 mm than the top surface of the filter bed 21. As shown in FIG. 1, the central cylinder 34 has a narrowed lower end connected to an outlet pipe 35 extending out through the wall of the housing 11.

The filtrate recovering member 30 may have any other desired structure than the above. For example, the collecting pipe 31 may be in the form of a volute or grids. The small openings 32 may also be formed in the side or upper surface of the pipe 31. The outlet pipe 35 need not extend downwardly. Since the filtration is performed under pressure, the filtrate can be discharged from the filter device even when the pipe 35 is oriented horizontally or upwardly.

The filter device shown in FIG. 1 is further provided with an air inlet pipe 2, an air injection nozzle 15 connected to the pipe 2, an air discharge port 3, a liquid discharge port 4 and a wash liquid discharge port 5. These components are provided for regenerating the filter bed when it is loaded with suspended solids to an extent that the filtering operation can be no longer continued satisfactorily.

In operation, white liquor containing suspended solids is pumped through the inlet pipe 1 and into the lower space beneath the supporting plate 12. The incoming liquor is uniformly distributed by the distributers 13 and flown up through the supporting bed 20 and filter bed 21. During the passage through the bed 21, the suspended solids in the liquor are removed. The filtrate is collected in the collecting pipes 31 and discharged from the filter device through the outlet pipe 35. The filtrate thus obtained is then subjected to the oxidation treatment as described above.

It is important that the upper space 22 above the filter bed 21 should be filled with the filtrate throughout the filtering operation. By so doing, even if the pressure of the liquor to be treated is increased for increasing the filtering rate, the granular solids of the filter bed 21 are not fluidized. That is, since the upper space 22 is filled with a liquid which is maintained in a static state because of the provision of the recovering member 30, the pressure of the incomming fluid applied to the bed is balanced with the back pressure exerted from the static liquid in the space 22.

When the pressure drop in the filter bed 21 reaches a predetermined level, the filtering operation is stopped to conduct the regeneration thereof. Thus, the supply of the liquor to be treated is stopped and the liquid in the upper space 22 is discharged from the outlet 4. Then, air is fed through the pipe 2 to stir the bed and to release the trapped solids from the filtering granules. The air is withdrawn overhead through the outlet 3. Then, the air supply is stopped and the liquor is fed through the pipe 1 to discharge the liquid in the housing from the outlet 5 together with the solids which have been released from the filtering granules. The feed rate of the liquor is adjusted to fluidize the largest filtering granules. When the feed of the fluid from the pipe 1 is stopped, the granules are spontaneously arranged in the original state and then the bed of the regenerated granules is set.

When the activity of the catalyst according to the present invention is decreased, the deactivated catalyst is then subjected to a regeneration treatment. The regeneration is preferably carried out while maintaining the catalyst in the packed state as such, without taking it out of the reactor.

The regeneration is effected by contacting the catalyst with an acid solution, preferably 1–5% hydrochloric acid, in an amount of 0.5–3 liters per liter of the packed catalyst. Nitric acid solution may be also used for the regeneration.

The deactivated catalyst generally carries sulfides such as sodium sulfide which, upon contact with hydrogen chloride, produce undesirable hydrogen sulfide as follows:

$$Na_2S + 2HCl = 2NaCl + H_2S \qquad (4)$$

Thus, it is important that the catalyst should be pretreated for the removal of the sulfides which deposit thereon before conducting the treatment with acid.

The removal of the sulfides from the catalyst may be effected by washing with water. Thus, water is fed to the reactor and flown through the catalyst bed. Alternatively, the pretreatment may be effected by converting the sulfides by reaction with oxygen according to the reaction (2) described above. In this case, an oxygen-containing gas such as air is fed to the reactor for contact with the catalyst bed.

The pretreated catalyst is then contacted with an acid solution. Thus, the acid solution is fed to the reactor and flown through the catalyst bed. The pretreated catalyst sometimes contains a small amount of sulfides which remain unremoved in the pretreatment step, causing the generation of hydrogen sulfide in the acid treatment step. In such a case, it is preferred that an oxygen-containing gas be fed to the reactor simultaneously with the acid solution. By this, the hydrogen sulfide may be converted into elemental sulfur according to the following reaction:

$$H_2S + \tfrac{1}{2}O_2 = H_2O + S \qquad (5)$$

The elemental sulfur may be easily removed from the catalyst bed in the succeeding sodium sulfide solution oxidation stage as polysulfide:

$$S + Na_2S = Na_2S_2 \qquad (6)$$

The catalyst thus treated with the acid solution is then washed with water to complete the regeneration. The resulting catalyst is ready for use again in the oxidation of sulfide containing solution.

The following examples will further illustrate the present invention.

EXAMPLE 1

A white liquor containing, in average concentrations, 31.4 g/liter of $Na_2S$ (calculated as $Na_2O$), 74.8 g/liter of NaOH (calculated as $Na_2O$) and 17.6 g/liter of $Na_2CO_3$ (calculated as $Na_2O$), 3.0 g/liter of $Na_2S_2O_3$ (calculated as S), 0.8 g/liter of $Na_2SO_3$ (calculated as S) and 140 ppm of suspended solids was treated as follows. The white liquor was filtered with an upflow type deep bed filter device as shown in FIG. 1 at a rate of 400 liter/hour to obtain a filtrate having a suspended solids content of 3 ppm. The filtering device has a cylindrical housing with an inside diameter of 12 inches and a filter bed formed from 73 liters of anthracite particles with an effective diameter of 1.0 mm and 1.4 mm.

Figure 3:
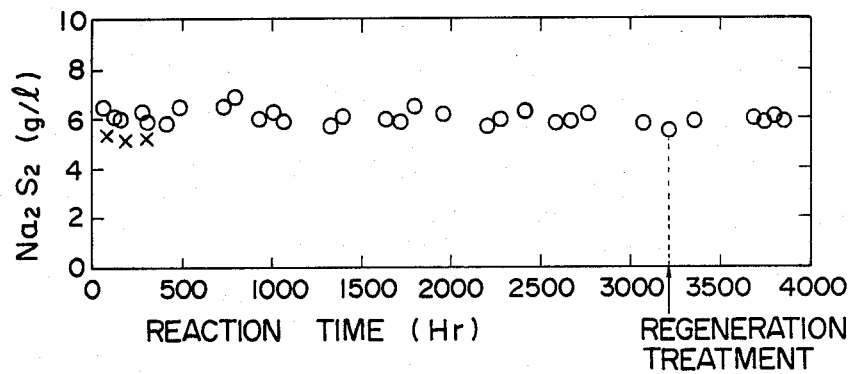
FIGS. 3 and 7 show the yield of sodium polysulfide with hours on stream.
Figure 4:
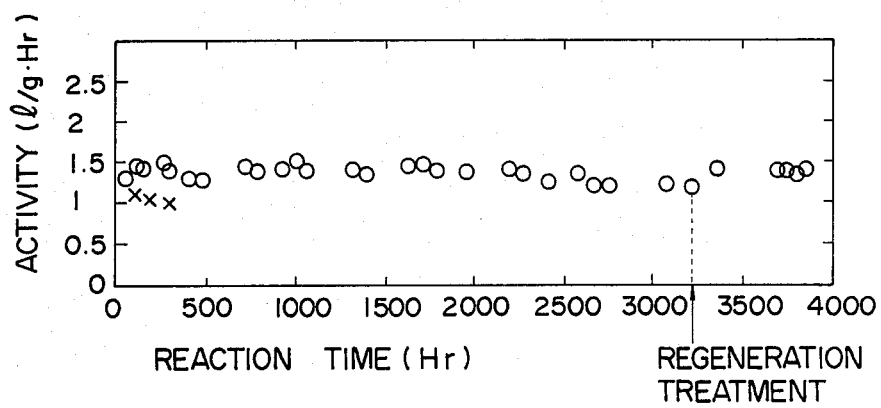
FIGS. 4 and 8 show the catalytic activity with hours on stream.

The filtrate was then subjected to an oxidation treatment in a cylindrical reactor which had an inside diameter of 8 inches and a height of 2 m and a liquid distributor having an opening area of 30% and which was provided with a fixed bed of particulate activated carbon catalyst No. 1 (50 liters) having the physical properties shown in Table 1. The filtrate and air were flown cocurrently downward through the fixed bed reactor in a trickle flow. The oxidation was performed at a temperature of 80° C. under atmospheric pressure with an air to liquid feed ratio of 50 normal-liter/liter. The relationship between the yield of sodium polysulfide and hours on stream and between the catalytic activity and hours on stream are shown in FIGS. 3 and 4, respectively (plotted by "o"). The catalyst was found to be deactivated after about 3000 hours from the starting of the oxidation. Thus, the oxidation was stopped to carry out a regeneration treatment by washing with water, then with diluted hydrochloric acid and finally with water again. The regenerated catalyst was used again for the oxidation of the sodium sulfide-containing filtrate.

EXAMPLE 2

Figure 5:
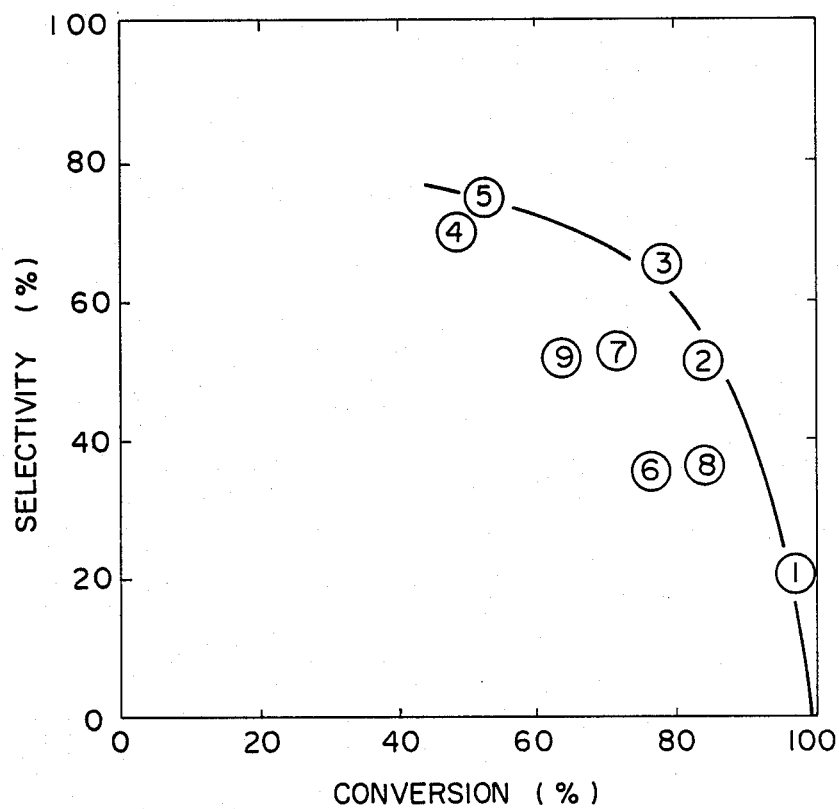
FIG. 5 shows the relationship between conversion of sodium sulfide and selectivity to sodium polysulfide in the oxidation of aqueous sodium sulfide using various oxidation catalysts.
Figure 6:
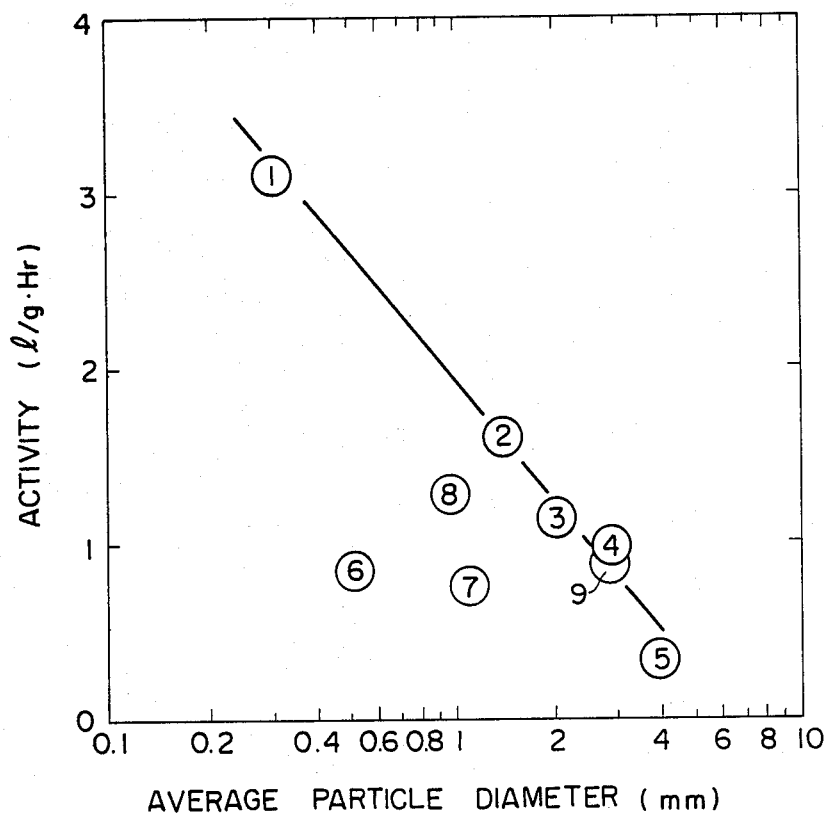
FIG. 6 shows the relationship between the particle size and the activity of various catalysts.

Particulate activated carbon catalysts Nos. 2–5 having the properties shown in Table 1 were packed in a glass tube fixed bed reactor having a diameter of 26 mm and a length of 50 cm. An aqueous solution having a composition shown in Table 2 was treated with respective catalysts under the conditions shown in Table 3. The catalyst No. 1 used in Example 1 was also tested for its activity in the same manner as above. The relationship between the conversion of sodium sulfide and the selectivity to sodium polysulfide in each catalyst is shown in FIG. 5. The relationship between the catalyst activity and particle size is shown in FIG. 6. In FIGS. 5 and 6, the numbers in the circles indicate the catalyst numbers. The term "catalyst activity" used herein is defined by the following equation:

$$K = (1/C_i - 1/C_o) \times V$$

where

K: Catalyst activity (liter/g.hour)
V: Weight hourly space velocity (hour$^{-1}$)
$C_o$: Content of Na$_2$S in feed (g/liter as Na$_2$O)
$C_i$: Content of Na$_2$S in product (g/liter as Na$_2$O)

TABLE 2

| Composition of Aqueous Solution | |
| --- | --- |
| Na$_2$S (g/liter, in terms of Na$_2$O) | 31.4 |
| NaOH (g/liter, in terms of Na$_2$O) | 74.8 |

TABLE 2-continued

| Composition of Aqueous Solution | |
| --- | --- |
| Na$_2$CO$_3$ (g/liter, in terms of Na$_2$O) | 17.6 |

TABLE 3

| Oxidation Conditions | |
| --- | --- |
| Amount of Catalyst (cc) | 100 |
| Reaction Temperature (°C.) | 80 |
| Reaction Pressure | Atmosphere |
| Air/Liquid Feed Ratio (normal-liter/liter) | 30 |
| Reaction Time (hour) | 4 |
| Type of Contact | Cocurrent trickle flow |

EXAMPLE 3

Using the catalyst No. 1 used in Example 1 and the same reactor as used in Example 2, oxidation tests were carried out under various reaction conditions as shown in Table 4. The catalytic activities of the catalyst in respective oxidation conditions are also summarized in Table 4.

TABLE 4

| | Catalytic Activity | | | | | | |
| --- | --- | --- | --- | --- | --- | --- | --- |
| Experiment No. | 1 | 2 | 3 | 4 | 5 | 6 | 7 |
| Temperature (°C.) | 60 | 80 | 95 | 80 | 80 | 80 | 80 |
| Pressure (kg/cm$^2$G) | 0 | 0 | 0 | 5 | 10 | 0 | 0 |
| Air/Liquid Feed Ratio (normal-lit./lit.) | 40 | 40 | 40 | 40 | 40 | 100 | 450 |
| Weight Hourly Space Velocity (hour$^{-1}$) | 9.0 | 9.0 | 9.0 | 24.0 | 52.4 | 9.0 | 9.0 |
| Catalytic Activity (lit./g · hour) | 0.44 | 1.01 | 1.73 | 2.64 | 5.88 | 1.70 | 2.07 |

TABLE 1

| | Properties of Particulate Catalysts | | | | | | | | | |
| --- | --- | --- | --- | --- | --- | --- | --- | --- | --- | --- |
| Catalyst No. | 1 | 2 | 3 | 4 | 5 | 6 | 7 | 8 | 9 | 10 |
| Raw material | A*1 | A | A | A | A + B*2 | C*3 | B | B | A + D*4 | A + D |
| Average particle diameter (mm) | 1.4 | 0.3 | 2 | 2.9 | 4 | 0.5 | 1.1 | 0.95 | 2.9 | 1.4 |
| Bulk density (g/cc) | 0.45 | 0.45 | 0.45 | 0.51 | 0.45 | 0.57 | 0.5 | 0.56 | 0.48 | 0.42 |
| Specific surface area (m$^2$/g) | 875 | 875 | 875 | 913 | 961 | 1125 | 938 | 700 | 851 | 820 |
| Total pore volume PV$_T$(cc/g) | 0.98 | 0.98 | 0.98 | 0.77 | 0.95 | 0.76 | 0.67 | 0.56 | 0.72 | 0.91 |
| Volume of pores with pore diameters of less than 100 Å(cc/g) | 0.52 | 0.52 | 0.52 | 0.49 | 0.53 | 0.58 | 0.45 | 0.34 | 0.46 | 0.49 |
| Volume of pores PV$_L$ with pore diameters of at least 100 Å (cc/g) | 0.46 | 0.46 | 0.46 | 0.28 | 0.42 | 0.18 | 0.22 | 0.22 | 0.26 | 0.42 |
| (PV$_L$/PV$_T$) × 100 (%) | 47 | 47 | 47 | 36 | 44 | 24 | 33 | 39 | 36 | 47 |

*1 A: Coal
*2 B: Palmnuts shell
*3 C: Pitch
*4 D: PTFE

EXAMPLE 4

Example 1 was repeated in the same manner as described except that the particulate catalyst No. 1 was replaced by the fibrous activated carbon catalyst No. 15

Figure 7:
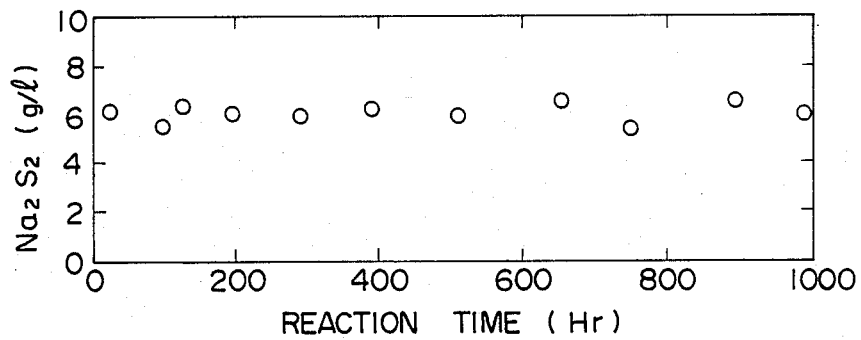
Figure 8:
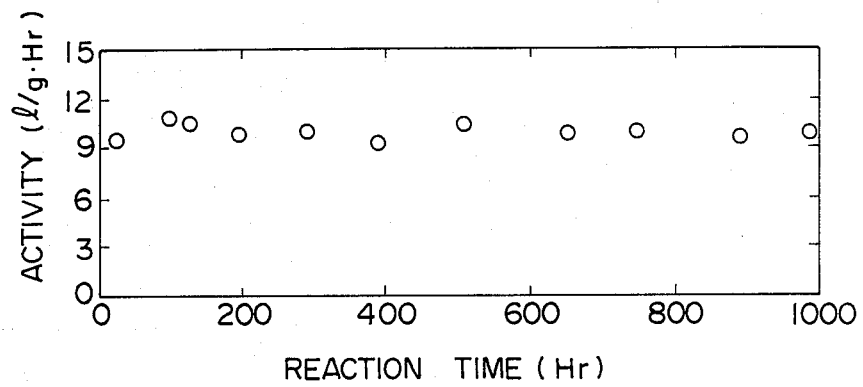

(1282 g) shown in Table 5. The results are shown in FIGS. 7 and 8 in the same manner as in Example 1.

EXAMPLE 5

The fibrous activated carbon catalysts having the properties shown in Table 5 were tested for their catalytic activities in the same manner as in Example 2. The results are also summarized in Table 5.

TABLE 5

| | Catalytic Activity of Fibrous Catalysts | | | | | | | |
|---|---|---|---|---|---|---|---|---|
| Catalyst No. | 11 | 12 | 13 | 14 | 15 | 16 | 17 | 18 |
| Specific Surface Area ($m^2/g$) | 2000 | 1160 | 1400 | 1430 | 720 | 1200 | 1500 | 1500 |
| Outer Surface Area ($m^2/g$) | 0.52 | 0.46 | 0.62 | 1.05 | 0.34 | 0.49 | 0.22 | 0.46 |
| Form | felt | felt | felt | yarn | felt | yarn | felt | felt |
| Amount (g) | 6.5 | 6.6 | 3.0 | 2.7 | 4.7 | 12.6 | 7.8 | 6.3 |
| Specific Catalytic Activity (lit./g · hour) | 3.4 | 4.0 | 8.0 | 25.3 | 9.7 | 3.1 | 5.9 | 5.5 |
| Yield of Sodium Polysulfide (g/lit. as S) | 6.3 | 5.2 | 3.6 | 7.7 | 7.8 | 5.7 | 7.0 | 6.6 |

EXAMPLE 6

Example 3 was repeated in the same manner as described except that the fibrous activated catalyst No. 15 was used in place of the particulate catalyst No. 1. The test results are shown in Table 6.

TABLE 6

| | Catalytic Activity | | | | | | |
|---|---|---|---|---|---|---|---|
| Experiment No. | 1 | 2 | 3 | 4 | 5 | 6 | 7 |
| Temperature (°C.) | 60 | 80 | 95 | 80 | 80 | 80 | 80 |
| Pressure ($kg/cm^2G$) | 0 | 0 | 0 | 4.5 | 9.5 | 0 | 0 |
| Air/Liquid Feed Ratio (normal-lit./lit.) | 40 | 40 | 40 | 40 | 40 | 100 | 500 |
| Weight Liquid Space Velocity ($hour^{-1}$) | 50 | 50 | 50 | 150 | 300 | 50 | 50 |
| Specific Catalytic Activity (lit./g · hour) | 4.6 | 10.5 | 18.2 | 25.6 | 56.5 | 17.9 | 21.0 |

COMPARATIVE EXAMPLE 1

Activated catalysts Nos. 6–8 having less than 0.25 cc/g of pore volume in pores having diameters of 100 Å or more were tested in the same manner as in Example 2 to obtain the results shown in FIGS. 5 and 6. The physical properties of the catalysts No. 6–8 are summarized in Table 1.

COMPARATIVE EXAMPLE 2

Activated catalyst No. 4 (1 kg) used in Example 1 was mixed with 500 g of an emulsified liquid containing 60 g of polytetrafluoroethylene with stirring for impregnation therewith, followed by drying at 190° C. in a hot air dryer, thereby to obtain wetproofed carbon catalyst No. 9 having the physical properties shown in Table 1. The catalyst No. 9 was tested in the same manner as in Example 2. The test results were as shown in FIGS. 5 and 6.

From the results shown in FIG. 5, it will be appreciated that the oxidation of sodium sulfide involves simultaneous, consecutive reactions shown by the reaction formulae (1)–(3) above and that the selectivity to sodium polysulfide is lowered with the increase in the conversion of sodium sulfide. The catalysts used in Example 2 exhibit superior selectivity as compared with the catalysts of Comparative Example 1. The catalyst impregnated with PTFE (Comparative Example 2) is also inferior to the catalysts of the present invention. The results shown in FIG. 6 indicate that the catalysts of this invention have improved catalytic activity as compared with the catalysts of Comparative Examples with similar catalyst diameters.

COMPARATIVE EXAMPLE 3

The particulate activated carbon catalyst No. 1 used in Example 1 was impregnated with PTFE in the same manner as in Comparative Example 2 to obtain catalyst No. 10 having the properties shown in Table 1. Using catalyst No. 10, a catalyst activity test was performed for 170 hours in the same manner as in Example 1 except that the feed rate of the solution was varied. The results are shown in FIGS. 3 and 4 (plotted by the mark "x").

From the results shown in FIG. 3, it will be seen that the catalyst according to the present invention exhibits good catalytic activity and produces sodium polysulfide with a high selectivity in a stable manner for a long period of time in the oxidization treatment of white liquor from an actual kraft pulping system. The catalytic activity of wetproofed catalyst No. 10 of Comparative Example 3 is inferior in comparison with catalyst No. 1 of the present invention, though both catalysts have similar pore characteristics. This is considered to be attributed to insufficient gas/liquid/solid contact in the catalyst bed which results from the wetproofing treatment. Thus, it will be appreciated that a particulate activated carbon catalyst, so far as it has a large pore volume in pores with diameters of 100 Å, can be suitably used for oxidation of sodium sulfide without any special treatment such as a wetproofing treatment.

We claim:

1. A method for the oxidation of sodium sulfide contained in an aqueous solution, comprising contacting the aqueous solution with an oxygen-containing gas and a catalyst consisting essentially of activated carbon to convert said sodium sulfide to polysulfide or sodium hydroxide in solution, said activated carbon catalyst being (1) a particulate catalyst having an average particle diameter of 0.2–4 mm, a pore volume of at least 0.25 cc/g in pores with diameters of not smaller than 100 Å and a pore volume of at least 35% of the total pore volume in pores with diameters of not smaller than 100 Å or (2) a fibrous catalyst having a specific surface area of 300–2500 $m^2/g$ and an outer surface area of 0.1–5.0 $m^2/g$.

2. A process of treating an aqueous solution containing sodium sulfide and suspended solids, comprising the steps of:
   (a) passing said aqueous solution up through a bed of granular solids to filter out the suspended solids, whereby a filtrate containing said sodium sulfide which is substantially free of the suspended solids is obtained; and
   (b) contacting said filtrate and an oxygen-containing gas concurrently with a catalyst consisting essentially of activated carbon in a fixed bed to oxidize the sodium sulfide to form polysulfide or sodium hydroxide in solution, said activated carbon catalyst being (1) a particulate catalyst having an average particle diameter of 0.2–4 mm, a pore volume of at least 0.25 cc/g in pores with diameters of not smaller than 100 Å and a pore volume of at least 35% of the total pore volume in pores with diameters of not smaller than 100 Å or (2) a fibrous catalyst having a specific surface area of 300–2500 $m^2/g$ and an outer surface area of 0.1–5 $m^2/g$.

3. A process as defined in claim 2, wherein step (a) is effected with the use of a filtering apparatus which comprises a closed vessel within which said bed of granular solids is provided at a position so that an upper space is defined above said bed of granular solids, and a filtrate recovering pipe member having a portion which is disposed adjacent to the upper surface of said bed of granular solids and which has a plurality of holes and wherein step (a) is performed while keeping said upper space filled with said filtrate and while applying pressure to said aqueous solution, so that said aqueous solution is forced to be flown up through said bed of granular solids and the resulting filtrate is recovered through said plurality of holes by said recovering pipe member.

4. A process as defined in claim 2, wherein the contents of the suspended solids in said aqueous solution and said filtrate are at least 20 ppm and less than 5 ppm, respectively.

5. A process as defined in claim 2, wherein said filtrate and the oxygen-containing gas are in counter current contact with each other in step (b).

6. A process as defined in claim 2, wherein said filtrate and the oxygen-containing gas are flown downwardly through said bed of activated carbon catalyst for cocurrent contact with each other in step (b).

7. A process as defined in claim 6, wherein a portion of the oxygen-containing gas is fed from a middle portion of the bed of the activated carbon catalyst with the remainder oxygen-containing gas being fed from the top thereof.

8. A process as defined in claim 2, wherein said fibrous activated carbon catalyst is shaped into a plurality of layers, with a reinforcing net being interposed between every layer.

9. A process as defined in claim 2, wherein said bed of activated carbon catalyst is separated into two or more vertically spaced apart layers and wherein a dispersing plate having a multiplicity of openings is disposed between each of the adjacent two layers, the total area of said openings of each dispersing plate being 15–35% of the area of said dispersing plate.

10. A process as defined in claim 2, wherein step (b) is performed at a temperature of 50°–130° C. and a pressure of 0–10 $Kg/cm^2G$ with a weight hourly space velocity of 0.5–500 $hour^{-1}$ and a feed ratio of said oxygen-containing gas to said filtrate of 10–500 normal-liter/liter.

11. A process as defined in claim 2, wherein step (b) is conducted under conditions so that the sodium sulfide is oxidized to form polysulfides.

12. A process as defined in claim 2, wherein step (b) is conducted under conditions so that the sodium sulfide is oxidized to form sodium hydroxide.

13. The method of claim 1 wherein said fibrous catalyst has a bulk density of 0.027–0.126.

14. The method of claim 2 wherein said fibrous catalyst has a bulk density of 0.027–0.126.

* * * * *